US007640228B2

(12) United States Patent
Hörentrup et al.

(10) Patent No.: US 7,640,228 B2
(45) Date of Patent: Dec. 29, 2009

(54) METHOD FOR RETRIEVING DATA FROM FIRST AND SECOND STORAGE MEDIUM

(75) Inventors: Jobst Hörentrup, Hannover (DE); Dirk Gandolph, Ronnenberg (DE); Axel Kochale, Springe (DE); Ralf Ostermann, Hannover (DE); Carsten Herpel, Wennigsen (DE)

(73) Assignee: Thomson Licensing, Boulogne Billancourt (FR)

( * ) Notice: Subject to any disclaimer, the term of this patent is extended or adjusted under 35 U.S.C. 154(b) by 292 days.

(21) Appl. No.: 10/570,108

(22) PCT Filed: Aug. 23, 2004

(86) PCT No.: PCT/EP2004/009392

§ 371 (c)(1),
(2), (4) Date: Mar. 1, 2006

(87) PCT Pub. No.: WO2005/022537

PCT Pub. Date: Mar. 10, 2005

(65) Prior Publication Data

US 2007/0143740 A1    Jun. 21, 2007

(30) Foreign Application Priority Data

Sep. 2, 2003    (EP)    ................................. 03090281

(51) Int. Cl.
*G06F 7/00*    (2006.01)
(52) U.S. Cl. ......................................................... 707/2
(58) Field of Classification Search ..................... 707/1, 707/2, 9
See application file for complete search history.

(56) References Cited

U.S. PATENT DOCUMENTS

| 5,644,782 | A | | 7/1997 | Yeates et al. |
| 5,764,972 | A | * | 6/1998 | Crouse et al. .................. 707/1 |
| 6,604,236 | B1 | | 8/2003 | Draper et al. |
| 2003/0024975 | A1 | * | 2/2003 | Rajasekharan ............... 235/375 |
| 2004/0133927 | A1 | * | 7/2004 | Sternberg et al. ........... 725/136 |
| 2005/0216443 | A1 | * | 9/2005 | Morton et al. .................. 707/3 |

FOREIGN PATENT DOCUMENTS

WO    WO 01/90860    11/2001

OTHER PUBLICATIONS

Search Report Dated December 3, 2004.

* cited by examiner

*Primary Examiner*—Charles Rones
*Assistant Examiner*—Fazlul Quader
(74) *Attorney, Agent, or Firm*—Robert D. Shedd; Robert B. Levy; Jorge Tony Villabon

(57) ABSTRACT

A method for modifying data read from read-only media during playback time comprises logically merging the on-disc directory tree and an associated off-disc directory tree. A logical directory tree is constructed from the data retrieved from the read-only medium, wherein the structure of the logical directory tree is identical with the structure of the directory tree of the medium. The method allows replacing content on the disc through downloaded content, e.g. replacing an out-dated trailer stored on the disc through a downloaded trailer for a new movie. The method further allows complementing or upgrading content on the disc, e.g. by downloading a new subtitle track from the internet.

11 Claims, 4 Drawing Sheets

METHOD FOR RETRIEVING DATA FROM FIRST AND SECOND STORAGE MEDIUM

This application claims the benefit, under 35 U.S.C. §365 of International Application PCT/EP04/009392, filed Aug. 23, 2004, which was published in accordance with PCT Article 21(2) on Mar. 10, 2005 in English and which claims the benefit of European patent application No. 03090281.1, filed Sep. 2, 2003.

FIELD OF THE INVENTION

This invention relates to a method for retrieving data from first and second storage medium.

BACKGROUND

Data on read-only storage media may not be modified. One example of such read-only media are prerecorded discs, e.g. Blu-ray discs (BDP).

Storage media, particularly optical discs, have usually unique identification labels. It is common that disc players may have integrated harddisk drives (HDD). Within an optical disc player, a Playback Control Engine (PCE) processes the data read from the disc. The data scope of a PCE is the disc. The playback process is controlled by a so-called Movie Module, which via an application interface (API) is connected to the PCE.

The data on the disc usually structured in a directory tree that is often standardized. E.g. for BDP the directory tree of a particular movie contains one folder for the playlist, one folder with streaming data and one folder for the clipinfo, describing the stream data structure. AV data on a BDP disc are contained in streams, which are multiplexed into a so-called main multiplex.

In this application, the term "directory tree" is used for a complete directory structure as well as for a particular branch of a directory structure, even hierarchical branches, when referring to rewritable media.

SUMMARY OF THE INVENTION

For optical disc formats, it is desirable to be able to download content from the studios server to the local player. Basically, there are two applications for downloaded content:

First, content on the disc shall be replaceable through downloaded content. A typical example is the replacement of an older or out-dated trailer that is stored on the disc through a downloaded trailer, e.g. for a new movie.

Second, content on the disc shall be completable or upgradable. A typical example is the download of a new subtitle track, e.g. in another language, which is not available on the disc.

There are two solutions to store downloaded content locally: This can either be realized through equipping the player with a separate local rewritable storage medium, e.g. a HDD, or through some rewritable memory on the disc itself. The first case is preferred, since media for the latter case are more expensive, and players are often equipped with a rewritable local storage medium.

When separate local storage is applied, i.e. integrated HDD, a mechanism is needed that combines or associates content on local storage with content on a disc. E.g. in case of a downloaded subtitle track, the player needs information to which disc the track belongs, and more specifically, to what content on that disc the track is associated.

The present invention provides a mechanism to associate off-disc content, e.g. downloaded from the internet and stored on a HDD, with content on the disc, on-disc content.

The basic idea of the invention is to create a directory tree for each disc on the local storage device (off-disc directory tree). As soon as a disc is inserted into the player, the on-disc directory tree and the associated off-disc directory tree are logically merged. The association is provided through unique disc identifiers or unique content identifiers. Playback of content on the inserted disc involves the merged directory tree. In this way, content on local storage is seamlessly integrated.

Appropriate merge rules provide the possibility to update on-disc content with off-disc content. Technically, this is achieved through logically replacing an on-disc file with an off-disc file. The invention also allows supplementing on-disc content with off-disc content. This is achieved through logically adding an off-disc file to an on-disc directory. Two modes are possible for determining which on-disc file should be replaced by an off-disc file: either replacement is only done if the file names match exactly, or replacement is done if a particular mapping method is defined for mapping off-disc file names to on-disc file names, e.g. an off-disc file named "b.clpi" may replace an on-disc file named "a.clpi" if in the corresponding directories there is only one file available with the file name extension "clpi".

According to the invention, data are retrieved from a first and a second storage medium and combined, or merged, such that a logical directory tree is generated that contains the data of both media. The logical directory tree contains files that are available only in the first or the second directory tree, and for files that are available in both directory trees the version available from the second directory tree.

Particularly, the disclosed method for retrieving data from first and second storage medium, wherein the data on the first storage medium are stored as files structured in a first directory tree, and the data stored on the second storage medium are stored as files structured in a second directory tree, comprises that the first storage medium has an identification label attached, and a branch of the second directory tree stored on the second storage medium refers to the identification label, further that the branch of the second directory tree is a subset of the first directory tree, or identical with the first directory tree, further that a logical directory tree is constructed from the retrieved data, wherein the structure of the logical directory tree is identical with the structure of the first directory tree, further that files that are available only in the first or the second directory tree are also available in the logical directory tree, and finally that for files that are available in the first and the second directory tree, the version available from the second directory tree is available in the logical directory tree.

An apparatus that utilizes the method is disclosed in claim 8.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of an exemplary directory tree for BDP.

DETAILED DESCRIPTION OF THE INVENTION

Figure 1:
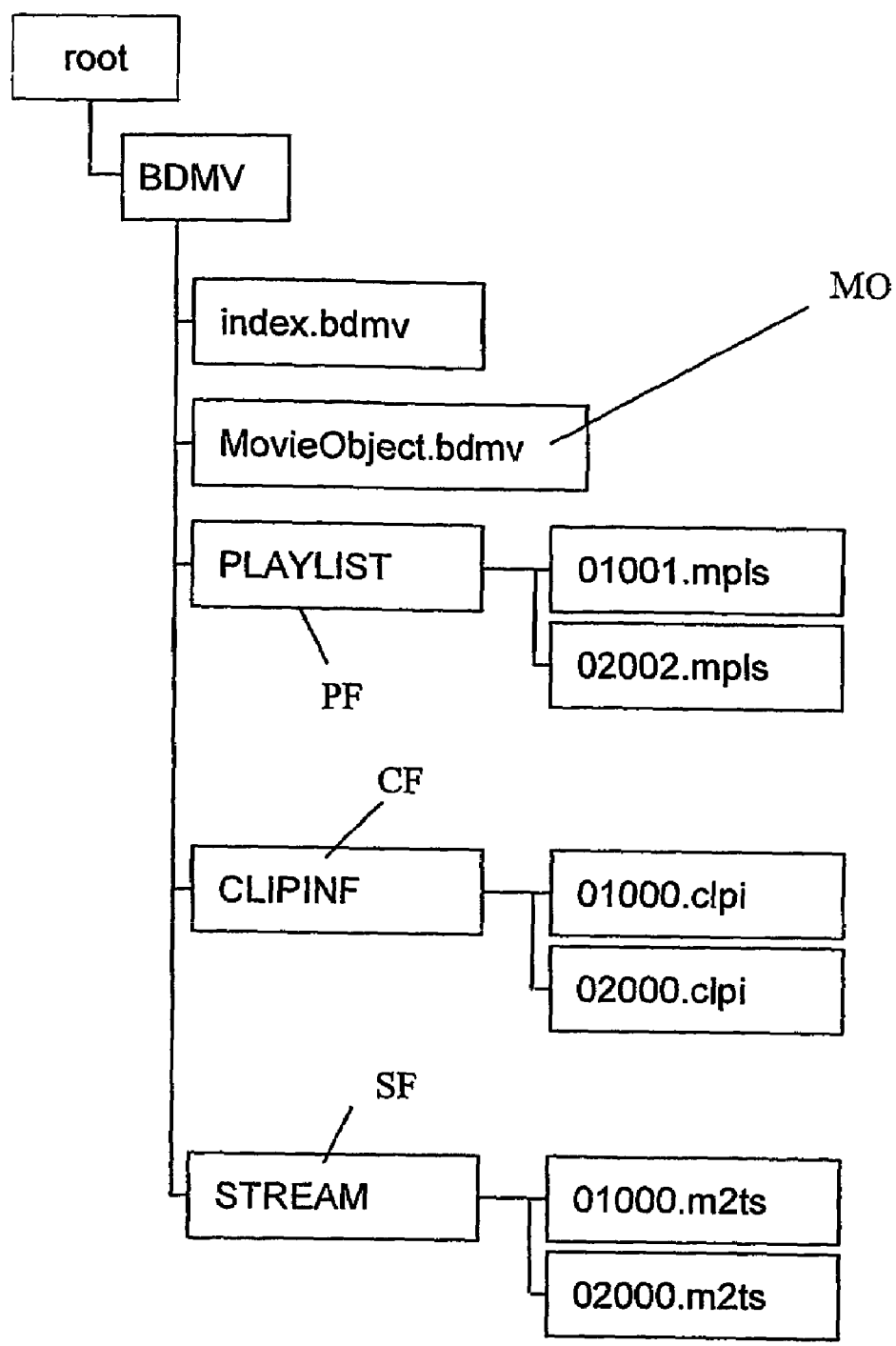

Data on optical discs are usually organized in files, which in turn are organized in a standardized directory tree, the on-disc directory tree. The file system provides an abstraction from the underlying storage medium. An exemplary standardized on-disc directory tree is shown in FIG. 1. It contains for a certain movie object MO a playlist folder PF, a clipinfo folder CF and a data stream folder SF. Each of these folders contains files with file extensions that identify the file type, e.g. "mpls" for playlist files.

The basic idea of the invention is to create a directory tree for a disc on a rewritable local storage device, so that an off-disc directory tree is created. As soon as a disc is inserted into the player, the on-disc directory tree is merged with the associated off-disc directory tree. In case there is no off-disc directory tree on the local storage device, e.g. when the disc is inserted into the player for the first time, an empty off-disc directory tree is created, according to the employed standard.

Any disc provides a unique identifier. This can either be a unique disc ID or a unique content ID. There may be several directory trees provided on the local storage device for various discs, e.g. one branch for each disc that was ever inserted into the player. The local storage device holds additional information, which associates one of the directory trees, or rather one branch of the directory tree of the local storage device, with a disc. Preferably, the off-disc directory tree's top-level name is derived from the disc ID. In the simplest case, the name directly corresponds to the ID.

In general, the structure of the off-disc-tree is arbitrary. Additional rules specify, how each off-disc-folder is merged into the on-disc-tree. Preferably for simplicity and practical reasons, the off-disc directory tree is similarly structured as the on-disc directory tree.

Figure 2:
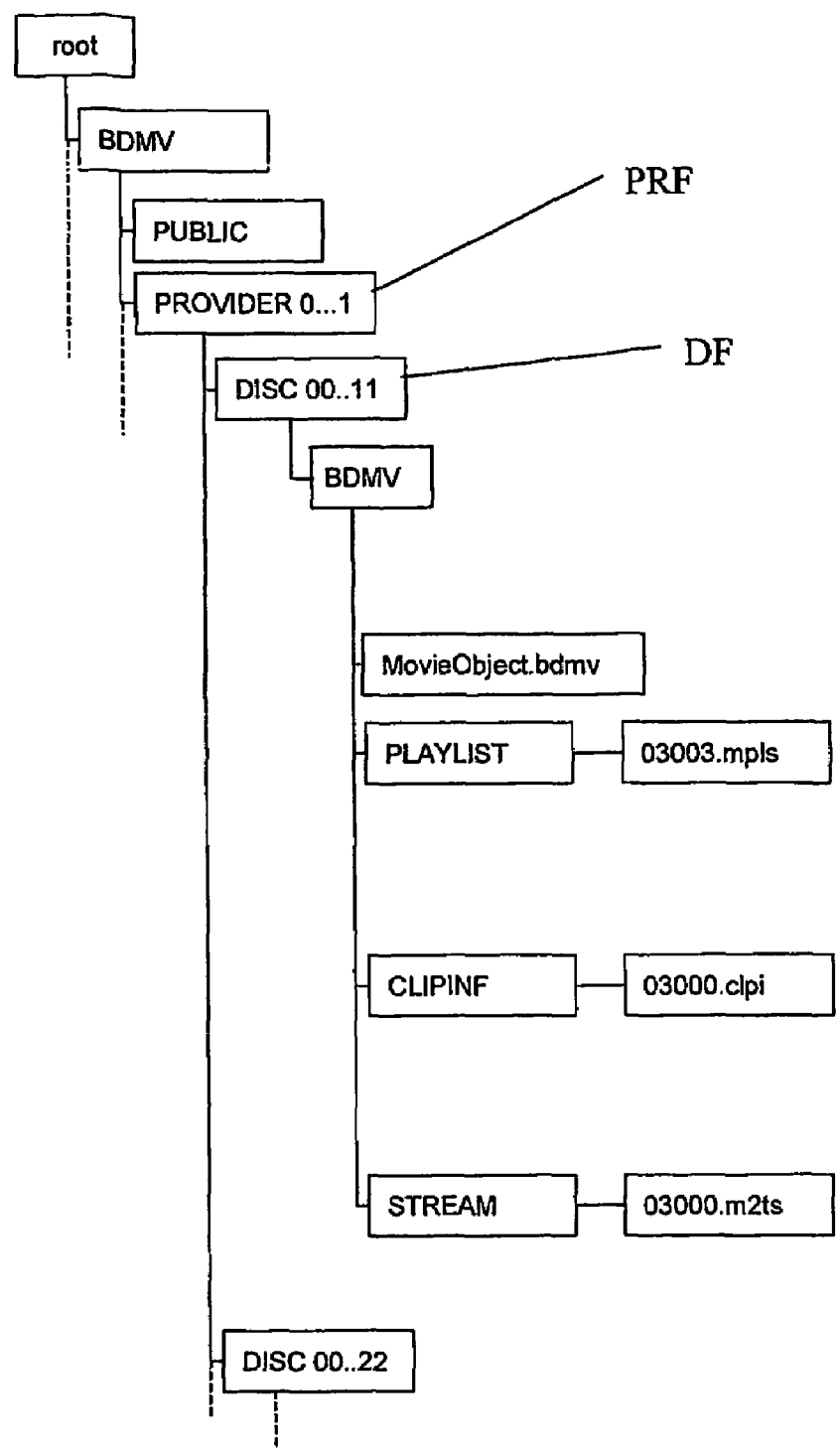
FIG. 2 the structure of an exemplary local storage directory.

An option to further speed-up the search for off-disc content is possible through the usage of unique provider identifiers. In addition to the unique disc/content identifier, this unique identifier is also provided with the disc. For each provider, or each provider from which the player ever read a disc, there is a directory created on the local storage device. The corresponding folder name is derived from the provider ID. In the simplest case, the name directly corresponds to the ID. Any off-disc-tree is then created as a subdirectory in the associated provider directory. This grouping has the advantage of speeding up the search process to find off-disc content, as only the provider's directory has to be searched for off-disc content. An exemplary directory structure is shown in FIG. 2. The data referring to a disc from a certain provider are stored in a disc folder DF which in turn is stored in a provider folder PRF.

In a scenario where applications need a direct and explicit application programming interface (API) to local storage, this structure has additional advantages. Particularly, the proposed hierarchical structure can easily serve as a basis for access rights management. Simple rules can be established that restrict an applications access to local storage.

For example, a possible rule could allow an application on a disc labelled XY, published by a provider named Z, to read and write to the associated off-disc directory named XY, and read, but not write, from any other directories within publisher Z's directory tree, while access to any other directories on local storage is forbidden.

For any downloaded type of content, the storage location on local storage is specified and the player knows where additional downloaded content can be found on the local storage device. When downloading streams, the stream itself and also corresponding information about the stream file is stored.

Merging the off-disc directory tree with the on-disc directory tree allows the unified handling of off-disc content and on-disc content within the player at playback.

Figure 3:
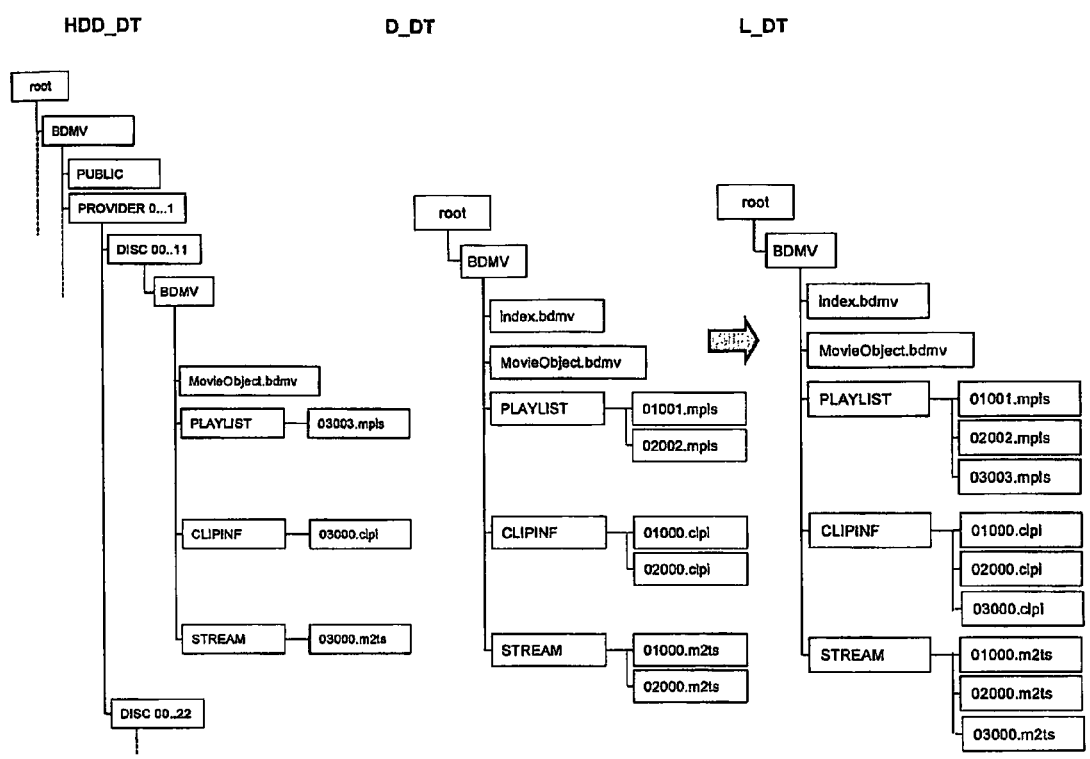
FIG. 3 an exemplary merge operation.

An exemplary merge operation is shown in FIG. 3. Data from a directory tree HDD_DT from a HDD and data from a directory tree D_DT from a read-only disc are merged to a logical directory tree L_DT that is used by the PCE of the player. The logical directory tree L_DT is constructed temporarily at run-time.

The inventive method has the particular advantage that the interface between the Movie Module and the PCE may remain unchanged as compared to today's standard. The merge operation rules are as follows:

When merging two directories, files in the off-disc directory are added to the files in the on-disc directory. This allows adding content at playback time.

When merging two directories, and the same file exists in the off-disc directory as well as in the on-disc directory, the file in the off-disc directory takes precedence. This allows replacing content from the disc by other data at playback time, e.g. new subtitles or an enhanced audio stream.

The application of downloading additional A/V components, e.g. audio or subtitle tracks, requires additional information. Binding information is needed to associate the downloaded track not only with the disc, but also with the corresponding main multiplex on the disc.

It is assumed that the downloaded off-disc stream and the associated on-disc main multiplex have the same length on the timeline. In other cases additional information needs to be provided that describe where on the timeline the downloaded track is associated with the main multiplex.

To associate the off-disc component with the main on-disc multiplex, two methods are described in the following:

Method 1

The off-disc components file name obey the following rules:

The first part identifies the main multiplex and associates the component with it. It is thus the same for all associated components.

The second part, preferably separated from the first part through an underscore, must be unique among all additional components of the main multiplex.

Information files are also stored in a separate folder, whose names are derived from the off-disc component.

Figure 4:
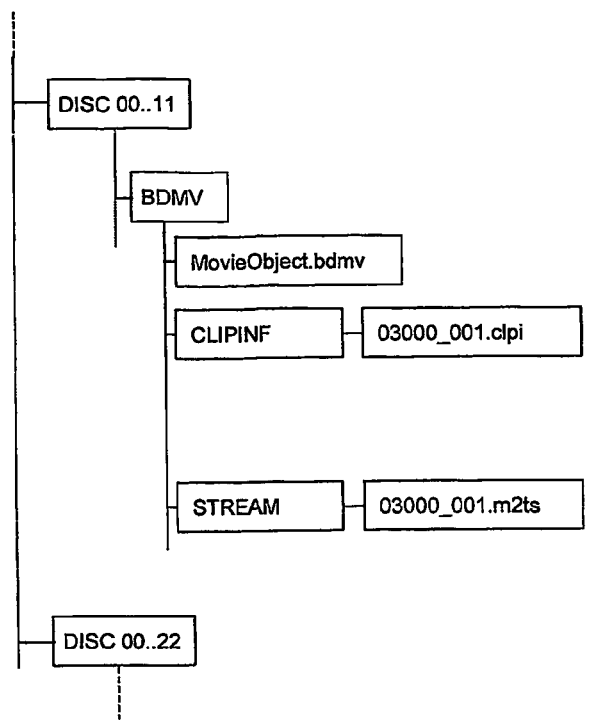
FIG. 4 and example for binding information carried in file names.

An example is shown in FIG. 4. The first part 0300 of the clipinfo file and the stream file associates the files with the main multiplex, while the second part 001 is unique among the two shown additional components.

Method 2

In this method, binding information is provided through the use of appropriate sub-directories Off-disc components associated with an on-disc multiplex are stored in a separate folder, whose name is derived from the main multiplex on the disc.

All off-disc information files are also stored in a separate folder, whose name is derived from the main multiplex on the disc.

File names must be unique among all additional components of the main multiplex.

Figure 5:
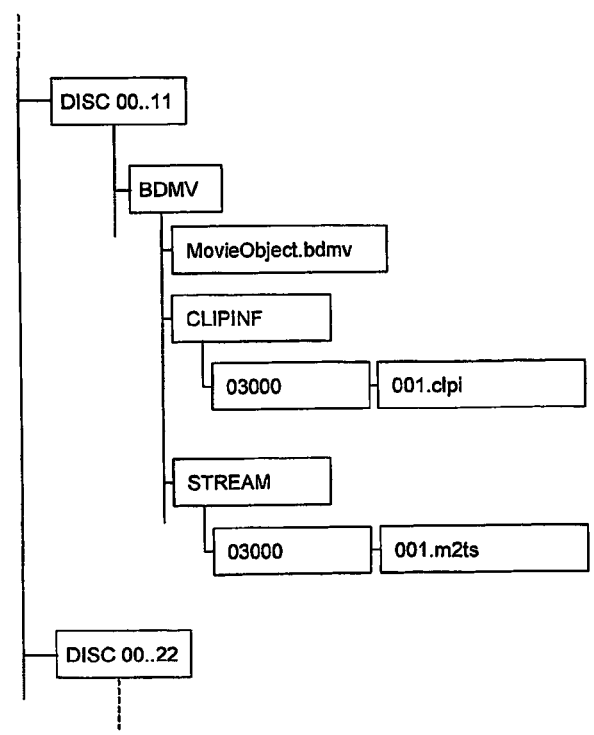
FIG. 5 an example for binding information carried in folder names.

An example is shown in FIG. 5. A clipinfo file 001.clpi and a stream data file 001.m2ts are stored in subdirectories 03000, being subdirectories of the clipinfo folder and the stream folder respectively. The file names 001 are derived from the main multiplex on the disc.

The inventive method may use any type of rewritable media to add data to any type of read-only media. Examples for rewritable media are magnetic storage devices, such as HDDs, floppies, RAM modules or the like. Examples for read-only media are DVD−R/+ or prerecorded Blu-ray discs (BDP).

In principle, the disclosed method is also suitable for updating or complementing data stored on a read-only medium by data from another read-only medium.

As a preferred embodiment, data stored on a BDP may be updated or complemented by data stored on a HDD.

The invention claimed is:

1. A computer implemented method for generating a multimedia presentation based on data retrieved from a first read-only storage medium and data retrieved from a second rewritable storage medium, wherein the data on the first storage medium are stored as files structured in a first directory tree, and the data stored on the second storage medium are stored as files structured in a second directory tree, wherein the first storage medium has a first and a second identification label attached, the method comprising the steps of:
   in a first determining step, determining that a first branch of the second directory tree corresponds to the first identification label and a second branch of the second directory tree corresponds to the second identification label, wherein the second branch is a subbranch of said first branch;
   in a second determining step, determining whether for a first file from the first directory tree, a second file from the second directory tree exists that has a file name matching the name of the first file;
   constructing a logical directory tree from the first and second directory tree, wherein the first file from the first directory tree is included if, according to the second determining step, no second file matching the name of the first file exists on the second directory tree, and wherein otherwise the second file from the second direction tree is included instead of the first file;
   retrieving data from the first and second storage medium according to the logical directory tree; and
   generating a multimedia presentation based on said retrieved data, wherein said data from the first and the second storage medium are seamlessly integrated.

2. The method according to claim 1, wherein the second branch of the second directory tree is a subset of the first directory tree, or identical with the first directory tree.

3. The method according to claim 1, wherein data from the first and the second storage mediums are retrieved simultaneously.

4. The method according to claim 1, wherein the first storage medium is provided by a provider, and the first identification label refers to the provider and is unique for the provider, and the second identification label is unique for the first storage medium or the content stored on the first storage medium.

5. The method according to claim 1, wherein the first storage medium is an optical disc and the second storage medium is rewritable, and the data files contain audio and/or video and/or subtitle data.

6. The method according to claim 1, wherein the logical directory tree is constructed temporarily at run-time.

7. The method according to claim 1, wherein for the second determining step a mapping method is defined for mapping file names retrieved from the first directory tree with file names retrieved from the second directory tree.

8. The method according to claim 1, wherein a third storage medium that has two labels attached accesses data from said first branch of the second storage medium if the first of the two labels equals said first label of the first storage medium and the second label is different from the second label of the first storage medium.

9. Apparatus for generating a multimedia presentation based on data retrieved from a first read-only storage medium and data retrieved from a second rewritable storage medium, wherein the data on the first storage medium are stored as files structured in a first directory tree and the data stored on the second storage medium are stored as files structured in a second directory tree, wherein the first storage medium has a first and a second identification label attached, the apparatus comprising:
   first drive for accessing the first read-only storage medium;
   second drive for accessing the second rewritable storage medium;
   means for reading first directory tree structure, first data files and first and second identification label from said first storage medium;
   means for reading second directory tree structure and second data files from said second storage medium;
   first comparing and determining means for comparing file names of the first and second data files and for determining whether for a first file from the first directory tree a second file from the second directory tree exists that has a file name matching the name of the first file;
   second comparing and determining means for comparing the first identification label of the first storage medium with an identifier for a first subbranch of the second storage medium, and for determining that are the first identification label and the identifier for the first subbranch of the second storage medium corresponding;
   third comparing and determining means for comparing the second identification label of the first storage medium with an identifier for a second subbranch of the second medium and for determining that are the second identification label and the identifier for the second subbranch of the second storage medium corresponding, wherein the second subbranch is a subbranch of said first subbranch;
   means for constructing a logical directory tree from the first and the second directory tree, wherein the first file from the first directory tree is included if according to the first comprising and determining means no second file matching the name of the first file exists on the second directory tree, and wherein otherwise the second file from the second directory tree is included instead of the first file;
   means for retrieving data from the first and second storage medium according to the logical directory tree; and
   means for generating a multimedia presentation based on said retrieved data, wherein said data from the first and the second storage medium are seamlessly integrated.

10. Apparatus according to claim 9, wherein the first storage medium is provided by a provider, and the first identification label refers to and is unique for the provider, and the second identification label refers to and is unique for the first storage medium, or the content stored on the first storage medium.

11. Apparatus according to claim 9, further comprising means for mapping file names retrieved from the first storage medium with file names retrieved from the second storage medium according to a predefined mapping method.

* * * * *